(12) United States Patent
Davis

(10) Patent No.: US 10,723,834 B1
(45) Date of Patent: Jul. 28, 2020

(54) LOW MELTING AND LOW VISCOSITY THERMOSET MATRIX RESINS FROM THE Z CONFIGURATION OF POLYHYDROXY STILBENES

(71) Applicant: The United States of America, as represented by the Secretary of the Navy, Arlington, VA (US)

(72) Inventor: Matthew C. Davis, Ridgecrest, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/877,758

(22) Filed: Apr. 13, 2018

(51) Int. Cl.
*C08G 63/193* (2006.01)
*C08G 18/76* (2006.01)
*C08G 65/42* (2006.01)

(52) U.S. Cl.
CPC ....... *C08G 18/7685* (2013.01); *C08G 63/193* (2013.01); *C08G 65/42* (2013.01); *C08G 2650/62* (2013.01)

(58) Field of Classification Search
USPC .................................................. 528/501, 502
See application file for complete search history.

(56) References Cited

U.S. PATENT DOCUMENTS

2013/0296613 A1* 11/2013 Kishi ...................... C07C 37/14
568/641

* cited by examiner

*Primary Examiner* — Terressa Boykin
(74) *Attorney, Agent, or Firm* — Naval Air Warfare Center Weapons Division; Stuart H. Nissim

(57) ABSTRACT

The invention generally relates to novel poly-substituted cis stilbenes, their synthesis, their purification, and their use in thermoset resins. These novel cis stilbenes give rise to thermoset resins with greatly improved processing characteristics such as lower melting temperature and lower viscosity; resulting in polymers and composites having greatly improved thermal stability.

16 Claims, 4 Drawing Sheets

LOW MELTING AND LOW VISCOSITY THERMOSET MATRIX RESINS FROM THE Z CONFIGURATION OF POLYHYDROXY STILBENES

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to novel poly-substituted, Z stilbenes (cis stilbenes), their synthesis, their purification, and their use in thermosetting resins.

DETAILED DESCRIPTION OF EMBODIMENTS OF THE INVENTION

Figure 1:
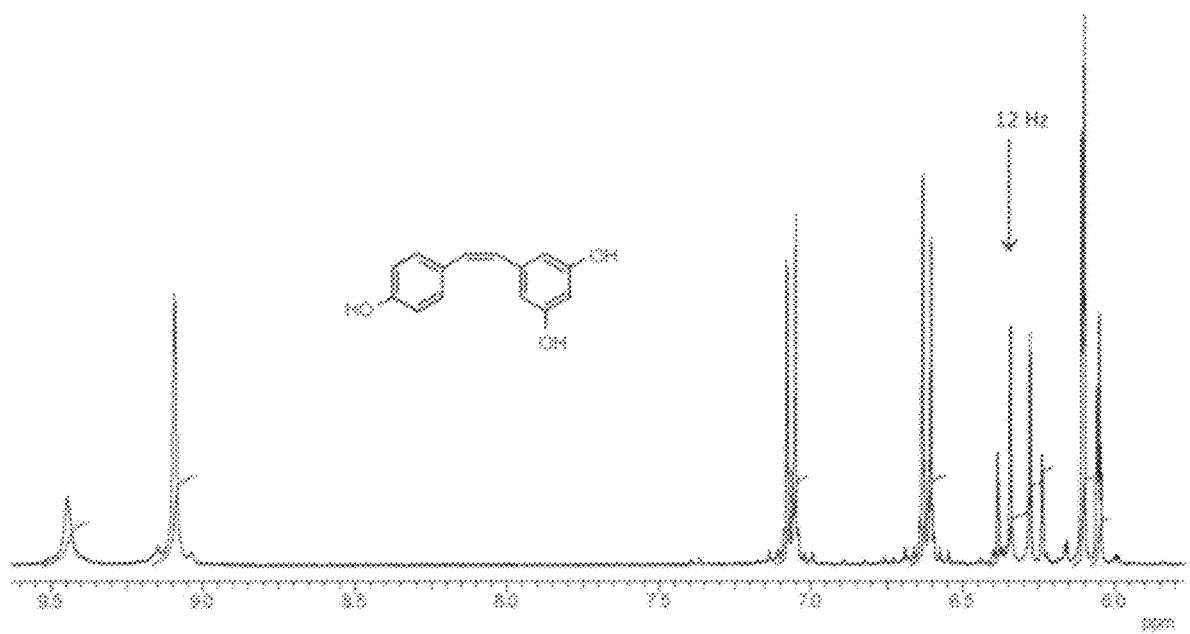
FIG. 1 is a graph of a Proton NMR spectrum of cis resveratrol in deuteriochloroform solvent according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are also illustrated schematically in the accompanying drawings and in the appended claims.

The novel cis stilbenes of the present invention give rise to thermosetting resins with greatly improved processing characteristics such as lower melting temperature and lower viscosity. Their thermosets have greatly improved thermal stability. An improved purification method produces these cis stilbenes at purities over 95%, Polymer matrix composites (PMCs) are widely used in all facets of modern life, from bath tubs and doors to sporting goods (bicycles, racquets) and safety gear (helmets, fire suits), as well as automobile (F1 racing) and aerospace designs (Boeing 787, Airbus A350). Incorporation of PMCs into vehicles is desirable owing to the high strength to weight ratio they afford resulting in improved fuel economy, a major driving force in current transportation designs. These organic composites are manufactured by the incorporation of woven fibers into an organic polymer resin. The polymer matrix binds the fibers together like glue, fixing the desired shape and helping to spread and transfer load to the fibers, as well as protecting the fibers from abrasion. Fibers can be natural (e.g. hemp, sisal) or synthetic products such as glass, aramid (Kevlar®) and carbon fiber. The most common matrix resins are thermosets such as epoxies, unsaturated esters and phenolics.

However there are limits to the use of PMCs, most notably due to difficulties in forming more complex shapes as well as thermal limitations of the polymer resins as they will soften or de-vitrify as temperature increases. Above the polymer's glass transition temperature (Tg) there will be a corresponding decrease in strength and stiffness and this value is associated with the temperature limit of the composite. Sustained at temperatures near or exceeding Tg for an extended period of time could cause dimensional changes in the composite part, delamination or, in the worst case, catastrophic failure and even fire. High-performance thermosets such as polyimide and bismaleimide (BMI) have better thermal stability than epoxies and their composites have been used in sections of wings and fuselage subjected to aerodynamic heating and areas near turbofans of jet aircraft (e.g. Lockheed Martin F-35). However, these latter resins tend to be more expensive and are more challenging to process and fully polymerize (or cure).

Another class of thermosetting resins that could be useful in PMCs is cyanate esters (aryl-O—C≡N). These resins can be readily manufactured from widely available phenolics (e.g. bisphenols, novolacs) by cyanation. Cyanate esters will cure without void forming volatiles simply by heating to 200-300° C. resulting in infusible polycyanurates. For example:

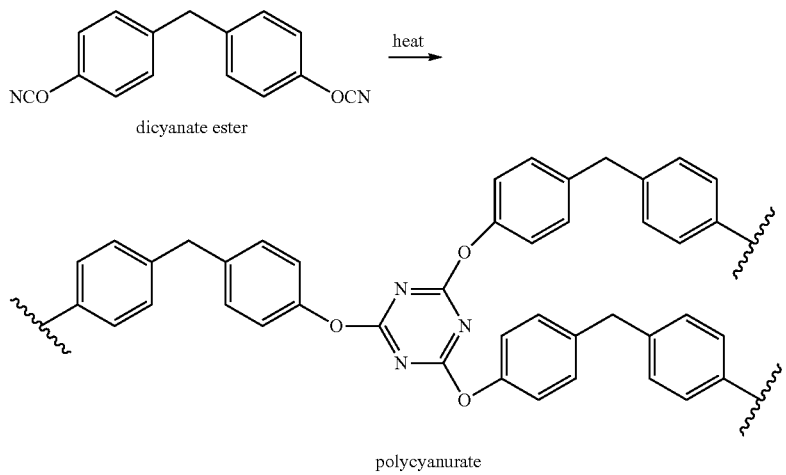

The polycyanurates typically have better hot/wet performance than BMI which is critical for aircraft deployed in marine environments. One example is the tricyanate ester made from the natural product resveratrol (trans 3,4',5-trihydroxystilbene). This compound cures to a highly cross-linked polycyanurate with Tg>350° C. which could be useful for high-temperature composite applications. Unfortunately, it has a very high melting temperature (Tm=170° C., 338° F.) and poor solubility that greatly limits its usefulness in composite fabrication. The synthesis/extraction of trans resveratrol cyanate esters are described in U.S. Pat. No. 8,853,343 (US Navy).

The new thermosetting resins of the present invention have greatly improved processing characteristics: low melting temperatures, increased solubility, and heat resistance. Compared to characteristic trans compounds, the cis stereochemistry of the 1,2-diphenylethylenes (stilbenes) of the present invention unexpectently have much lower melting temperatures (approximately 100° C. lower) as well as good solubility in a variety of organic solvents. These stable, low melting materials after polymerization have heat resistance at least as good as trans-stereochemical compounds.

An embodiment of a process of the present invention for making thermosetting materials comprises:

isomerizing a trans-polyhydroxystilbene, having at least two hydroxy substituent groups, to the cis configuration;

purifying the cis polyhydroxystilbene;

converting the cis polyhydroxystilbene to a thermosetting material by converting the hydroxyl substituents; and, curing the cis polysubstituted stilbene.

Preferred embodiments of the cis polysubstituted stilbenes of the present invention are represented by the formula:

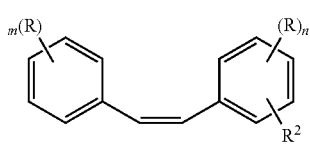

where m is 0, 1, or 2 and n is 1 or 2;
where R is —OH, cyanate ester (—O—C≡N), glycidyl ether (—O—CH$_2$-2-oxirane), acrylate (—O—CO—C=CH$_2$). or methacrylate (—O—CO—C(CH$_3$)CH$_2$); and,
where R$^2$ is H or methoxy.

In preferred embodiments the trans polyhydroxystilbene can be obtained from a natural product resource or through transgenic microbial production. In preferred embodiments, the trans polyhydroxystilbene has at least two hydroxy groups. Examples of preferred trans polyhydroxystilbenes include, but are not limited to, trans resveratrol (trans 3,4',5-trihydroxystilbene), trans pinosylvin (trans 3,5-dihydroxystilbene), trans 4,4'-dihydroxystilbene, trans 3,3'-dihydroxystilbene, trans 3,4'-dihydroxystilbene, trans 3,3',5,5'-tetrahydroxystilbene, trans 3,3',5-trihydroxystilbene, trans oxyresveratrol (trans 2,3',4,5'-tetrahydroxystilbene), and trans thunalbene (trans 3,3'-dihydroxy-5'-methoxystilbene).

In still further embodiments the trans polyhydroxystilbene is isomerized to the cis configuration through the application of radiation, preferably UV radiation, more preferably 300-350 nanometer wavelength light. Illustrated in the formula:

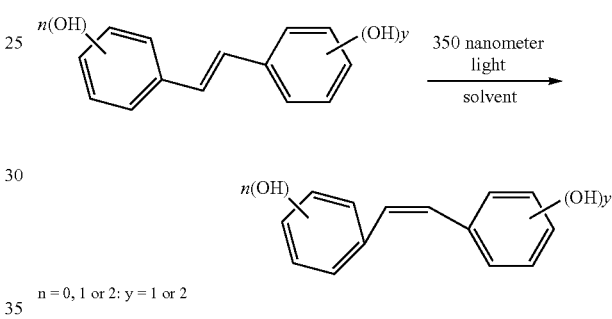

n = 0, 1 or 2; y = 1 or 2

In preferred embodiments, the cis polyhydroxystilbenes are purified using selective solvent extraction to at least 85% purity, more preferably to at least 95% purity.

In preferred embodiments, the cis polyhydroxystilbenes are then transformed into thermosetting resins using typical synthetic organic techniques to convert the hydroxy substituents. The hydroxyl groups are converted into polymerizable functional groups including for example, but not limited to, cyanate ester (—O—C≡N), glycidyl ether (—O—CH$_2$-2-oxirane), and vinyl ester including acrylate (—O—CO—C=CH$_2$), and methacrylate (—O—CO—C(CH$_3$)CH$_2$). In preferred embodiments all hydroxyl groups are converted to the same polymerizable functional group. Examples of such conversions are illustrated by the formula:

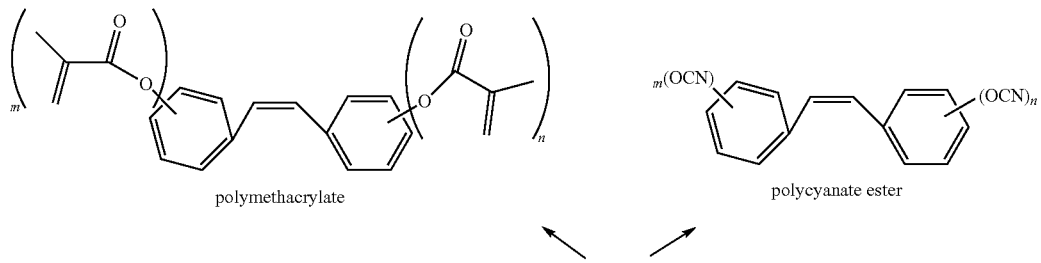

polymethacrylate    polycyanate ester

-continued

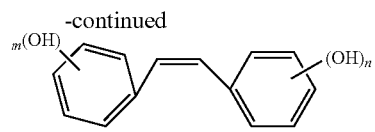

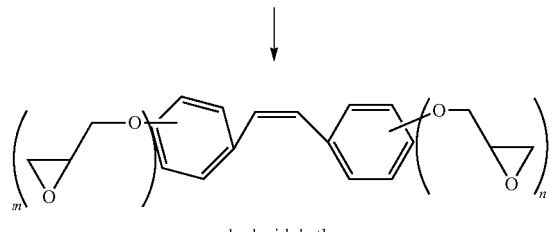

polyglycidyl ether m = 0, 1 or 2; n = 1 or 2

In other embodiments of the invention the cis polyhydroxystilbenes are converted into, but not limited to, phthalonitrile, poly ether ether ketone, polysulfones and polyimides all with greatly improved processing characteristics compared to the trans configuration.

EXAMPLES

For the following examples melting points were collected on a Mel-Temp II from Laboratory Devices (Holliston, Mass.) and are not corrected. All NMR data were collected on a Bruker Avance II 300 MHz spectrometer (1H at 300 MHz, 13C at 75 MHz). Elemental analyses were performed by Atlantic Microlab, Inc. (Norcross, Ga.). Differential scanning calorimetry (DSC) was performed on ~5 mg samples of monomer after de-gassing in sealed aluminum pans using a TA Instruments Q100 calorimeter under 50 mL/min of flowing nitrogen. All thermogravimetric analysis (TGA) studies were performed on a TA Instruments Q5000 thermogravimetric analyzer in a standard, aluminum pan under a nitrogen or air atmosphere.

Example 1 cis-Resveratrol (cis 3,4',5-trihydroxystilbene)

A borosilicate flask (1 L) equipped with magnetic stirring bar, reflux condenser and $N_2$ bubbler was charged with trans-Resveratrol (10.44 g, 45.8 mmol) and acetonitrile (660 mL). The solution was stirred and gently sparged with $N_2$ for 1 hour prior to reaction to remove dissolved oxygen. The reaction setup was mounted in a photochemical reactor with long wavelength bulbs ($\lambda$=350 nm) for 18 hours. During these work-up steps, the products were protected from fluorescent light by covering with aluminum foil or storage in a closed cupboard. The pale yellow colored reaction mixture was cooled to room temperature and then the solvent and volatiles were rotary evaporated at reduced pressure (60 torr) and a bath temperature of 30° C. The remaining pale yellow, semi-solid residue was slurried with a mixture of toluene/acetonitrile (75 mL/25 mL) for 30 min. Filtration through a medium porosity, glass fritted filter funnel gave trans resveratrol (1.7 g, 16%). The latter product was a pale yellow colored powder but was otherwise pure by $^1$H NMR analysis. The filtrate was rotary evaporated at reduced pressure (30 torr) and a bath temperature of 30° C. yielding crude cis resveratrol as a pale yellow, granular powder which was ~98% by $^1$H NMR analysis. The crude product could be further purified to analytically pure, colorless needles by slow evaporation from the same solvent mixture. Yield: 8.4 g (81%). Mp: 174° C. $^1$H NMR (300 MHz, CDCl$_3$/DMSO-d$_6$, $\delta$, ppm): 8.48 (bs, 4'OH), 8.13 (bs, 3 and 5 OH), 7.16 (d, J=8.3 Hz, 2H), 6.69 (d, J=8.3 Hz, 2H), 6.42 (d, $J_{ab}$=12.2 Hz, 1H), 6.35 (d, $J_{ab}$=12.2 Hz, 1H), 6.33 (d, J=2.0 Hz, 2H), 6.26 (t, J=2.2 Hz, 1H); $^{13}$C NMR (75 MHz, CDCl$_3$/DMSO-d$_6$, $\delta$, ppm): 158.02, 156.15, 139.33, 130.09, 129.28, 128.11, 128.06, 114.95, 106.87, 101.66. Anal. Calcd for $C_{14}H_{12}O_3$: C, 73.68; H, 5.26. Found: C, 73.49; H, 5.28. The coupling constants (12.2 Hz) for the alkene protons, 12.2 Hz, clearly show the latter has cis configuration rather than trans, which are typically ~16 Hz.

Many groups have reported separation of the resveratrol geometric isomers by high performance liquid chromatography, however this requires extensive method development, additional equipment, and material purchases. Using gravity flow chromatography on a stationary phase of silica gel was effective in purifying the very close running isomers with a gradient of ethyl acetate in hexanes and the isomer ratio did not change with the silica gel treatment. The remaining ~20% trans resveratrol post-isomerization was effectively removed from the mixture by relying on its poor solubility in organic solvents. Thus, cis resveratrol having good solubility in a mixture of acetonitrile in toluene (1:3), the insoluble trans resveratrol could be filtered away. The purified cis resveratrol was characterized by proton and carbon NMR which corresponded well to literature values. (FIG. 1)

Example 2

Following the method of Example 1 where the mixture of toluene/acetonitrile was substituted with diethyl ether. The remaining pale yellow, semi-solid residue was slurried with the diethyl ether. Thereafter, filtering and rotary evaporating at reduced pressure (60 torr) and a bath temperature of 30° C. the filtrate yielded crude cis resveratrol as a pale yellow, granular powder which was ~85% by 1H NMR analysis.

Example 3

Following the method of Example 1 where a mixture of toluene/acetonitrile in a 5 to 1 ratio was utilized. The remaining pale yellow, semi-solid residue was slurried with the mixture of toluene/acetonitrile. Thereafter, filtering and rotary evaporating at reduced pressure (30 torr) and a bath temperature of 30° C. the filtrate yielded crude cis resveratrol as a pale yellow, granular powder which was 95% by 1H NMR analysis.

Example 4

Following the method of Example 2 where the diethyl ether is substituted with another dialkyl ether, including for example, dipropyl ether, dibutyl ether, methyl tert-butyl ether, or diisopropyl ether.

Example 5

Following the method of Example 3 where the mixture of toluene/acetonitrile is substituted with another 5:1 mixture of solvents, including but not limited to, benzene/acetonitrile, ethylbenzene/acetonitrile, toluene/ethyl acetate, benzene/ethyl acetate, or ethylbenzene/ethyl acetate.

Example 6

Irradiation ($\lambda$ 350 nm) of trans resveratrol dissolved in methanol with standard borosilicate glassware gave an 80% conversion to cis resveratrol. This light reaction was also very clean and no cyclobutane dimers or other by-products were formed in the reaction. The progress of the reaction was conveniently monitored by dissolving an aliquot of the reaction mixture in deuterochloroform for proton nuclear magnetic resonance (NMR) spectroscopy. The alkene hydrogen atoms of the cis isomer had the characteristic ~12 Hz coupling that are shifted upfield from the trans isomer with ~16 Hz.

Example 7 cis-3,4',5-Tricyanatostilbene (cis resveratrol tricyanate)

To minimize isomerization of the product, all flasks used to contain the products of the reaction were protected from fluorescent lighting by covering with aluminum foil or similarly opaque material. A round-bottomed flask (250 mL) equipped with an elliptically-shaped, magnetic stirring bar was charged with cis resveratrol (2.37 g, 10 mmol) and anhydrous THF (50 mL). An addition funnel and N2 bubbler were equipped and the mixture was stirred and cooled in a −20° C. bath. Next, BrCN (3.9 g, 35 mmol, 3.5 equiv) was added to the flask and allowed to dissolve completely. The addition funnel was then charged with TEA (3 g, 30 mmol, 3 equiv) which was added dropwise over 30 min. Copious solids (triethylammonium hydrobromide) precipitated during the addition of the base. After the addition was complete, the cooling bath was removed and the reaction mixture was stirred at room temperature for 1 hour. The reaction mixture was partitioned between Et$_2$O (200 mL) and H$_2$O (200 mL). The aqueous layer was discarded and the organic phase was washed again with H$_2$O (2×200 mL). Next, the organic layer was washed with brine, separated and dried over anhydrous MgSO$_4$. The solvent was rotary evaporated (60 torr, 30° C. water bath temperature) leaving the crude product as an off-white powder. The product could be further purified by recrystallization from a solvent mixture composed of heptane and EtOAc which gave the product in the form of colorless needles. Yield: 2.63 g (86%). Mp: 77-80° C. 1H NMR (300 MHz, CDCl$_3$, $\delta$, ppm): 7.28 (s, 4H), 7.14-7.09 (m, 3H), 6.87 (d, J$_{ab}$=12.1 Hz, 1H), 6.63 (d, Jab=12.1 Hz, 1H); 13C NMR (75 MHz, CDCl$_3$, $\delta$, ppm): 153.52, 152.66, 141.96, 134.44, 133.30, 130.93, 127.89, 116.21, 114.04, 108.52, 107.48, 103.21. Anal. calcd for C17H9N3O3: C, 67.33; H, 2.99; N, 13.86. Found: C, 67.07; H, 3.15; N, 13.88. The coupling constants for the alkene protons, 12.1 Hz, clearly show the latter has cis configuration rather than trans, which are typically ~16 Hz.

Example 8

It was found that the 85% pure cis resveratrol (Example 2) gave good quality cis resveratrol tricyanate ester which had all the properties of the 100% cis resveratrol tricyanate, including good solubility in solvents, low melting point, and easy processing. After solvent extraction, one has to remove the solvent, diethyl ether solvent is much easier to remove (boiling point ~35° C.) than the toluene/acetonitrile (boiling point 110° C.). The higher yielding method with toluene/acetonitrile requires more energy to remove the solvent, so for practical purposes including scale up, the diethyl ether process is suitable and faster.

Figure 2:
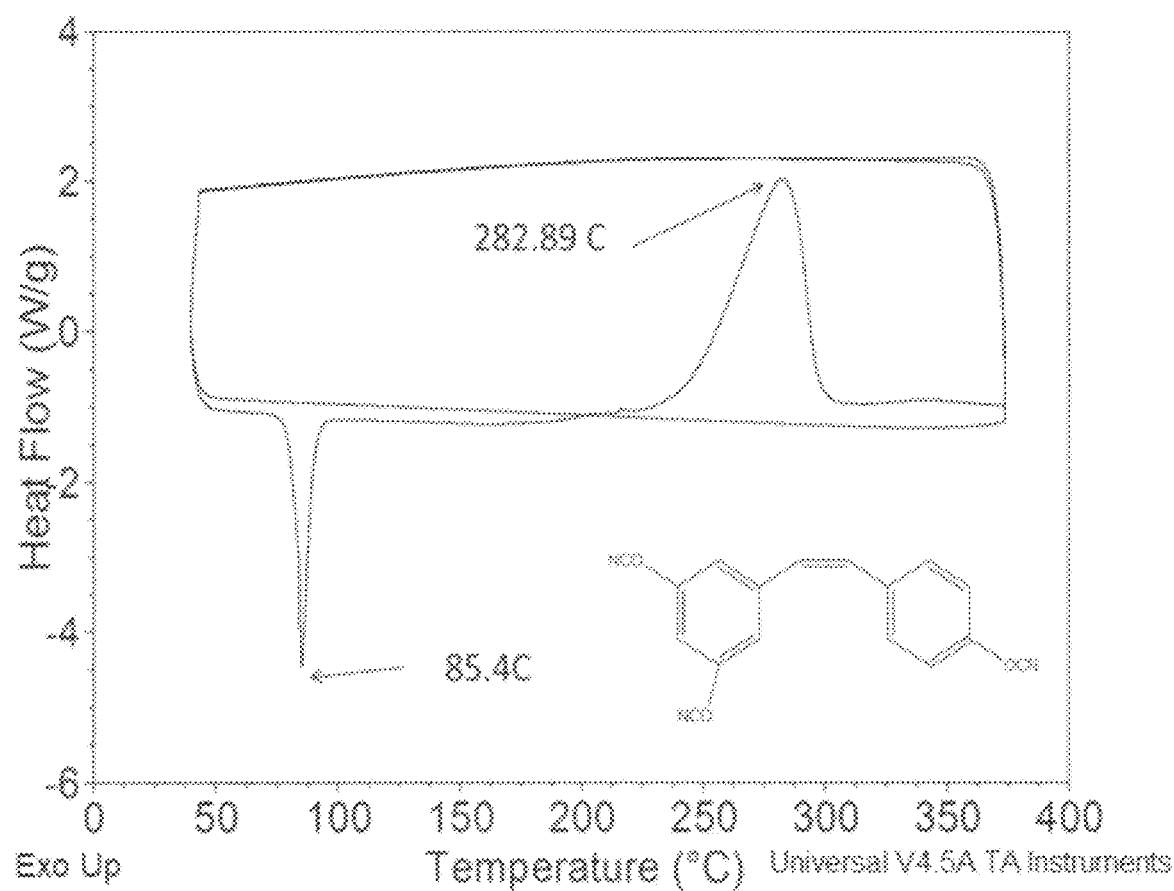
FIG. 2 is a graph of a DSC thermogram of cis resveratrol tricyanate (10° C./min) according to embodiments of the invention.

When that 5% trans resveratrol tricyanate was present in the 95% cis resveratrol tricyanate (Example 3) it might be expected to see two melting points, cis=77° C. and trans=170° C., but that wasn't the case, Only melting at 77° C. was observed. This may be because the amount of trans is so low it is just lost in the baseline. Because both isomers undergo the cure reaction at the same temperature (FIG. 2), at that point it becomes a thermally stable thermoset polymer and you can't do anything to it anymore. It is important that the cis remains cis before the polymerization process occurs; the cis isomers of the present invention remain stable and cis throughout the polymerization process.

Example 9

Other monomers are produced utilizing the methods of previous examples including, but not limited to, cis 3,5-dicyanatostilbene, cis 4,4'-dicyanatostilbene, cis 3,3'-dicyanatostilbene, cis 3,4'-dicyanatostilbene, cis 3,3',5,5'-tetracyanatostilbene, cis 3,3',5-tricyanatostilbene, cis 2,3',4,5'-tetracyanatostilbene, cis 3,3'-dicyanato-5-methoxystilbene Example 10

Figure 3:
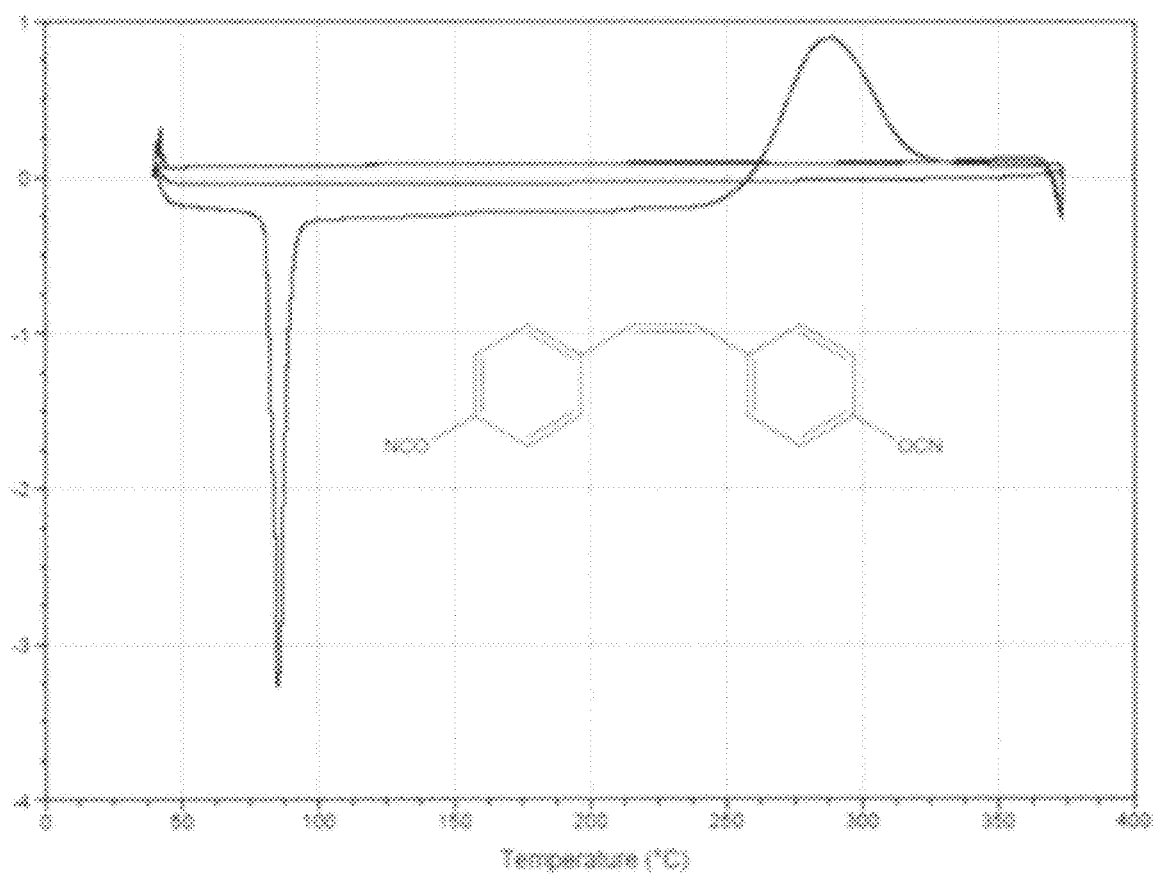
FIG. 3 is a graph of a DSC thermogram of cis 4,4'-dicyanatostilbene according to embodiments of the invention.

DSC thermogram of cis 4,4'-dicyanatostilbene (10° C./min). The trans isomer has a melting point of 175° C. (FIG. 3)

Example 11

Figure 4:
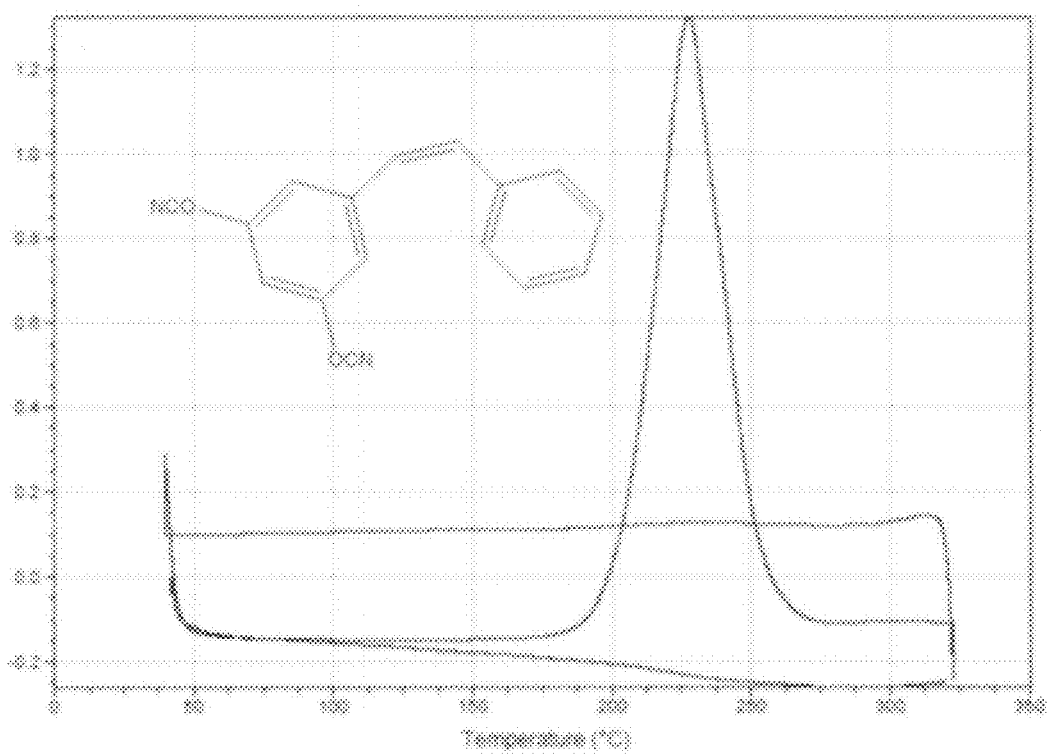
FIG. 4 is a graph of a DSC thermogram of cis 3,5-dicyanatostilbene according to embodiments of the invention.

DSC thermogram of cis 3,5-dicyanatostilbene (10° C./min). The trans isomer has a melting point of 155° C. (FIG. 4)

Example 12

Still other monomers are produced utilizing the methods of previous examples including, but not limited to, cis 3,4',5-trihydroxystilbene trimethacrylate, cis 3,5-dihydroxystilbene dimethacrylate, cis 4,4'-dihydroxystilbene dimethacrylate, cis 3,3'-dihydroxystilbene dimethacrylate, cis 3,4'-dihydroxystilbene dimethacrylate, cis 3,3',5,5'-tetrahydroxystilbene tetramethacrylate, cis 3,3',5'-trihydroxystilbene trimethacrylate, cis 2,3',4,5'-tetrahydroxystilbene tetramethacrylate, cis 3,3'-dihydroxy-5-methoxystilbene dimethacrylate.

Example 13

Still other monomers are produced utilizing the methods of previous examples including, but not limited to, cis 3,4',5-triglycidyloxystilbene, cis 3,5-diglycidyloxystilbene, cis 4,4'-diglycidyloxystilbene, cis 3,3'-diglycidyloxystilbene, cis 3,4'-diglycidyloxystilbene, cis 3,3',5,5'-tetraglycidyloxystilbene, cis 3,3',5'-triglycidyloxystilbene, cis 2,3',4,5'-tetraglycidyloxystilbene, cis 3,3'-diglycidyloxy-5-methoxystilbene

Example 14

Still other monomers are produced utilizing the methods of previous examples including, but not limited to, cis 3,4',5-trihydroxystilbene triacrylate, cis 3,5-dihydroxystilbene diacrylate, cis 4,4'-dihydroxystilbene diacrylate, cis 3,3'-dihydroxystilbene diacrylate, cis 3,4'-dihydroxystilbene diacrylate, cis 3,3',5,5'-tetrahydroxystilbene tetraacrylate, cis 3,3',5'-trihydroxystilbene triacrylate, cis 2,3',4,5'-tetrahydroxystilbene tetraacrylate, cis 3,3'-dihydroxy-5-methoxystilbene diacrylate.

For the following curing examples, resins were cured in an oven with a nitrogen purge to prevent oxidation, known to reduce strength in resins.

Example 15

Bulk samples of the monomer from Example 7 were cured by heating for 1 hour at 150° C. followed by 210° C. for 24 hours, referred to as the 'standard cure' conditions. The preparation of homogeneous, void-free cured samples of the cis polycyanurate (Example 7) was greatly facilitated by its low melting temperature,

Example 16

Samples (from Example 7) became fully cured when heated to 350° C.

Example 17

Complete cure was obtained following the curing schedule (Example 15) with a 'post-cure' step at 280° C. for 4 hours. These samples became fully cured showing Tg >350° C.

Example 18

The thermal stability of the cured polycyanurate was studied by thermogravimetric analysis (TGA), in both air and nitrogen atmosphere as shown in Table 1,

TABLE 1

Thermal data comparison of resveratrol tricyanate isomers

| Isomer | $T_m$ (° C.) | $\Delta H_{cure}$ (J/g) | $T_g$ (° C.) | $T_d$ (° C.) air | $T_d$ (° C.) $N_2$ | Char Yield (600° C.) air | Char Yield (600° C.) $N_2$ |
|---|---|---|---|---|---|---|---|
| trans | 170 | 851 | >340 | 412 | 417 | 71 | 74 |
| cis | 77 | 646 | >350 | 442 | 442 | 73 | 75 |

As shown in Table 1, the thermal stability data collected for the new thermosetting cis monomer compared favorably with that of the trans cyanate ester from resveratrol, Although the heat of cure for the cis monomer was ~20% less than the trans monomer, the resin also made a polycyanurate with high glass transition temperature. The resulting polycyanurate from the cis monomer had slightly higher thermal stability as evidenced by the char yields between the two isomers. The most favorable advantage of the cis monomer was its tremendously reduced melting temperature, nearly 100° C. less than its trans counterpart, which was in keeping with other stilbene geometric isomers. Since the cure exotherm for the cis monomer began at ~200° C., the resin has a >120° C. processing window where it can be handled in a liquid form before significant gelation takes place, a factor of great importance for various composite fabrication techniques (e.g. prepregging, filament winding and hand lay-up).

Embodiments of polymers from resins of the present invention are characterized by the repeating unit having the formula:

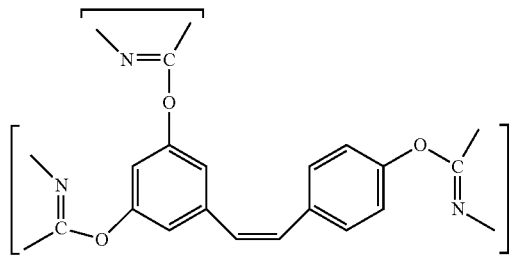

Other embodiments of polymers from resins of the present invention are characterized by the repeating unit having the formula:

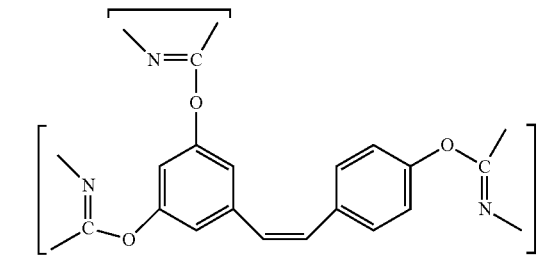

Still other embodiments of polymers from resins of the present invention are characterized by the repeating unit having the formula:

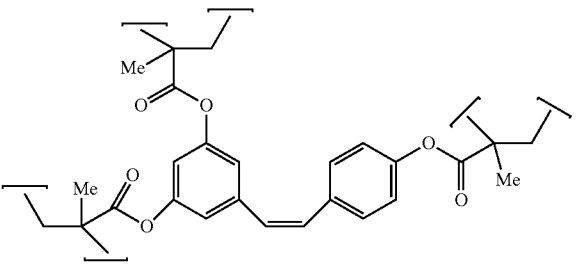

And other embodiments of polymers from resins of the present invention are characterized by the repeating unit having the formula:

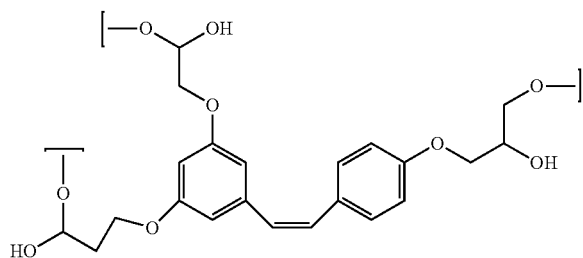

Although embodiments of the invention are described in considerable detail, including references to certain versions thereof, other versions are possible.

Any prophetic examples are for illustration purposes only and not to be used to limit any of the embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A process for the selective extraction of cis-polyhydroxystilbenes of more than 85% purity from a fraction of stilbenes, comprising:
   isomerizing trans-stilbenes in said fraction of stilbenes to cis-stilbenes;
   extracting cis-polyhydroxystilbenes from said isomerized fraction of stilbenes with a solvent;
   wherein said solvent is comprised of one or more solvents in which cis-stilbenes are soluble and trans-stilbenes are insoluble;
   and
   filtering out any insoluble trans-stilbenes and evaporating the solvent extract under reduced pressure to obtain cis-polyhydroxystilbenes.

2. A process for the selective extraction of cis-polyhydroxystilbenes from a fraction of stilbenes, comprising:
   extracting cis-polyhydroxystilbenes from said fraction of stilbenes with a solvent; and
   filtering and evaporating the solvent extract under reduced pressure to exclusively obtain cis-polyhydroxystilbenes
   wherein the selective solvent extraction yields a cis-polyhydroxystilbenes concentration greater than about 95%.

3. The process of claim 2 wherein said solvent comprises dipropyl ether, dibutyl ether, methyl tert-butyl ether, or diisopropyl ether.

4. The process of claim 2 wherein said solvent comprises a combination of a first solvent and a second solvent; wherein the ratio of the first solvent to the second solvent is between about 3:1 to about 5:1.

5. The process of claim 4 wherein the combination of first solvent/second solvent is selected from the group of combinations consisting of benzene/acetonitrile, ethylbenzene/acetonitrile, toluene/ethyl acetate, benzene/ethyl acetate, ethylbenzene/ethyl acetate.

6. The process of claim 2 wherein the solvent is a dialkyl ether.

7. A composition comprising the formula:

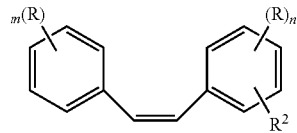

where m is 0, 1, or 2 and n is 1 or 2;
where R is —OH, cyanate ester (—O—C≡N), glycidyl ether (—O—CH$_2$-2-oxirane), acrylate (—O—CO—C=CH$_2$), or methacrylate (—O—CO—C(CH$_3$)CH$_2$); and,
where R$^2$ is H, or methoxy.

8. The composition of claim 7 where R is OH and R$^2$ is H.

9. The composition of claim 7 where R is —O—C≡N and R$^2$ is H.

10. The composition of claim 7 where R is —O—CH$_2$-2-oxirane and R$^2$ is H.

11. The composition of claim 7 where R is —O—CO—C(CH$_3$)CH$_2$ and R$^2$ is H.

12. The composition of claim 7 where R is —O—CO—C=CH$_2$ and R$^2$ is H.

13. The composition of claim 9 comprising cis 3,4',5-tricyanatostilbene, cis 3,5-dicyanatostilbene, cis 4,4'-dicyanatostilbene, cis 3,3'-dicyanatostilbene, cis 3,4'-dicyanatostilbene, cis 3,3',5,5'-tetracyanatostilbene, cis 3,3',5'-tricyanatostilbene, cis 2,3',4,5'-tetracyanatostilbene, or cis 3,3'-dicyanato-5-methoxystilbene.

14. The composition of claim 10 comprising cis 3,4',5-triglycidyloxystilbene, cis 3,5-diglycidyloxystilbene, cis 4,4'-diglycidyloxystilbene, cis 3,3'-diglycidyloxystilbene, cis 3,4'-diglycidyloxystilbene, cis 3,3',5,5'-tetraglycidyloxystilbene, cis 3,3',5'-triglycidyloxystilbene, cis 2,3',4,5'-tetraglycidyloxystilbene, or cis 3,3'-diglycidyloxy-5-methoxystilbene.

15. The composition of claim 11 comprising cis 3,4',5-trihydroxystilbene trimethacrylate, cis 3,5-dihydroxystilbene dimethacrylate, cis 4,4'-dihydroxystilbene dimethacrylate, cis 3,3'-dihydroxystilbene dimethacrylate, cis 3,4'-dihydroxystilbene dimethacrylate, cis 3,3',5,5'-tetrahydroxystilbene tetramethacrylate, cis 3,3',5'-trihydroxystilbene trimethacrylate, cis 2,3',4,5'-tetrahydroxystilbene tetramethacrylate, or cis 3,3'-dihydroxy-5-methoxystilbene dimethacrylate.

16. The composition of claim 12 comprising cis 3,4',5-trihydroxystilbene triacrylate, cis 3,5-dihydroxystilbene diacrylate, cis 4,4'-dihydroxystilbene diacrylate, cis 3,3'-dihydroxystilbene diacrylate, cis 3,4'-dihydroxystilbene diacrylate, cis 3,3',5,5'-tetrahydroxystilbene tetraacrylate, cis 3,3',5'-trihydroxystilbene triacrylate, cis 2,3',4,5'-tetrahydroxystilbene tetraacrylate, or cis 3,3'-dihydroxy-5-methoxystilbene diacrylate.

\* \* \* \* \*